US006862148B2

(12) United States Patent
Kakinoki et al.

(10) Patent No.: US 6,862,148 B2
(45) Date of Patent: Mar. 1, 2005

(54) FILM MOLDED CASING

(75) Inventors: Wataru Kakinoki, Yokohama (JP); Hiroaki Fukuchi, Sagamihara (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 10/637,630

(22) Filed: Aug. 11, 2003

(65) Prior Publication Data

US 2004/0064990 A1 Apr. 8, 2004

(30) Foreign Application Priority Data

Sep. 12, 2002 (JP) ....................................... 2002-266866

(51) Int. Cl.[7] .................................................. G02B 7/02
(52) U.S. Cl. ......................... 359/808; 359/809; 396/511
(58) Field of Search ............................. 359/788, 800–1, 359/804, 806–11, 815, 819; 396/411, 414, 417, 538, 440–42, 445–46, 511–528

(56) References Cited

U.S. PATENT DOCUMENTS 4,116,533 A * 9/1978 Nerlich ....................... 359/469
5,630,177 A * 5/1997 Yamada et al. ................ 396/6
6,312,828 B1 * 11/2001 Akao ......................... 428/516
2003/0219242 A1 * 11/2003 Kamata ......................... 396/6

FOREIGN PATENT DOCUMENTS

JP 2000-318052 11/2000

* cited by examiner

*Primary Examiner*—Jordan M. Schwartz
*Assistant Examiner*—Jessica Stultz
(74) *Attorney, Agent, or Firm*—Keating & Bennett, LLP

(57) ABSTRACT

A film molded casing includes a transparent or translucent film molded member having a printed layer provided on the inner surface thereof so as to define the place of an illumination display, and a casing inside of which a lens for guiding light of an inner light source to the appearance surface thereof is integrally formed with the casing using a light-permeable resin, in which a light transmitting area is integrally formed with the casing so as to be contiguous with the lenses, and on the inner surface of which a light-impermeable printed layer is provided. In this film molded casing, the light transmitting area is matched to the light transmitting area of the film molded member.

15 Claims, 3 Drawing Sheets

A-A'
B-B'

21
22
23a
23b
24a
24b
25a
25b
27a
27b
27c
27d
27e
28
24a-1
24a-2
24b-1
24b-2
B
B'
C
C'
C-C'
B-B'

FIG. 3A
PRIOR ART
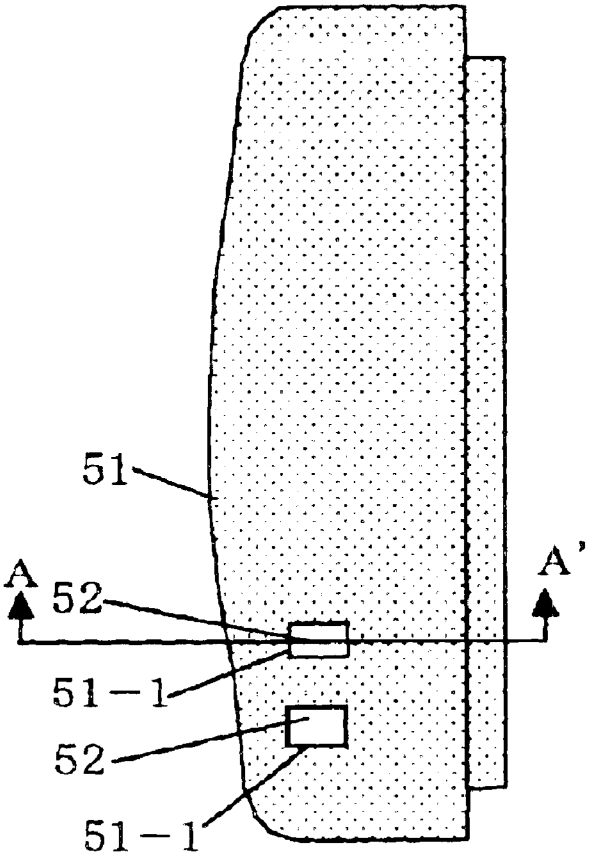
FIG. 3B
PRIOR ART
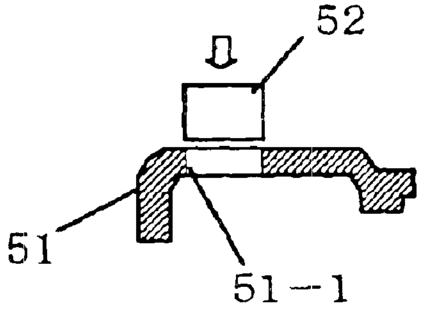
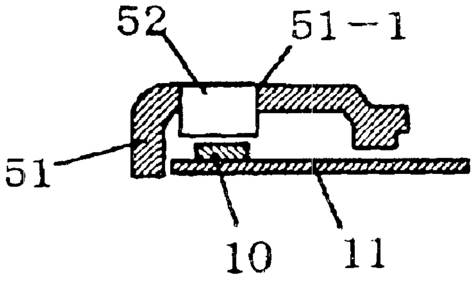
FIG. 3C
PRIOR ART

FILM MOLDED CASING

BACKGROUND OF THE INVENTION

1. Field of the Invention

The present invention relates to a film molded casing to which coloring or display can be easily applied by insert molding a transparent resin into a film molded member that has been subjected to coloring or display.

2. Description of the Related Art

In recent years, with the diversification of their functions, electronic devices, in particular, devices in which illumination display of the operational conditions of inner circuitry is performed, has been given various functional displays, and various patterns have been provided thereon in order to discriminate them from other products.

For a casing of such electronic devices, a resin molded product that has been formed by injection molding is used. The surface of this type of casing assumes a resin color by coloring, or a color by painting. When displaying characters or a symbol, such as the name of a company or a logo, on the casing surface, the display has usually been performed by methods as follows: 1) rugged display by molding, 2) insert molding of a plate with a pattern previously printed thereon into the casing surface when the casing is molded, 3) printing by hot stamping, or 4) silk printing onto the casing surface.

Meanwhile, in any of these coloring and display methods with respect to the casing, it is necessary to form a display window that allows illumination display elements in the casing to be visually identified from the outside. Therefore, a window hole has been formed in the casing, and a transparent resin cover which is a separate member has been fitted to the window hole.

FIGS. 3A to 3C show an example of the extending portion of a conventional CF (Compact Flash™) card. FIG. 3A is a plan view of the extending portion. FIGS. 3B and 3C are sectional views taken along the line A–A' in FIG. 3A, and these figures are each a process diagram illustrating an LED (Light-Emitting Diode) lens assembly process. Here, FIGS. 3B and 3C, respectively, show the extending portion before and after the LED lens assembly.

As shown in FIG. 3A, a casing 51 is formed by molding such as injection molding using a translucent or opaque resin material depending on the color of the resin itself, or coloring. There are provided rectangular window holes 51-1 penetrating the casing. As shown in FIG. 3B, an LED lens 52 is fitted into each of the window holes 15-1 of the casing 51. The fitting position of each of the LED lenses 52 relative to the casing 51 is adjusted so that the outside surface of each of the LED lenses 52 and that of the casing 51 become mutually flush, as shown in FIG. 3C, which illustrates a state of the LED lens 52 after assembling. As a result, each of the LED lenses 52 is disposed so as to oppose an LED 10 on a substrate 11.

In this manufacturing method for the casing, an assembly process between the LED lenses and casing is additionally needed. This unfavorably requires correspondingly more time and labor, resulting in an increased manufacturing cost of the casing.

The above-described conventional example involves another problem in that lenses molded separately from the main body using a resin with a high light-permeability must be each built into the light-emitting portion of the LED.

Under such circumstances, in order to solve some of the above-described problems, a technique to perform the formation of display windows concurrently with the molding of a casing by insert molding, has been proposed (see, for example, Japanese Unexamined Patent Application Publication No. 2000-318052).

According to this technique, a casing is formed by air-pressure forming a synthetic resin sheet having a transparent window portion and another opaquely colored and displayed portion to deeply draw the sheet, then insert molding the sheet after filling a transparent synthetic resin sheet on the rear surface of the sheet, and integrally forming a display window having the window portion.

In general, for a casing of the above-described conventional electronic device, a resin molded product is used in many cases. However, the color tone and feeling of the surface of this casing depend on a resin material for molding or a painting material for painting the surface after molding.

Also, there is a problem that a poor outer appearance such as a surface sink (i.e., an uneven thickness structure such as warp) or weld (due to poor transmission of pressure in a mold) may occur depending on a molding condition. When displaying characters or a symbol such as the company name on the surface of a resin molded product, rugged display has been provided by molding, or printing display has been performed on the outer surface of the resin molded product using silk printing method or the like. However, it is difficult to read rugged characters because the rugged characters are of the same color as that of the resin. Furthermore, a long-term use of the resin molded product accumulates dust in rugged portions, and/or causes peeling or the like of printed portions.

The light-emitting portions of LEDs provided on the casing of a conventional electronic devices have been arranged so that light-emitting states of the LEDs can be visually identified from the product surface side, by providing window holes in the casing body, and building, into each of the window holes, a lens component molded separately from the casing using a resin having a high light-permeability. In this case, it has been necessary to produce a mold for the LED lens besides a mold for the casing, and perform molding for the casing and LED lens separately from each other.

Furthermore, in manufacturing, there has been a process to build LED lenses into the casing, which has incurred the risk of omitting to build LED lenses into the casing and/or causing failures of components.

SUMMARY OF THE INVENTION

In order to overcome the problems described above, preferred embodiments of the present invention provide a film molded casing that dispenses with building-in work of a lens and that is capable of easily coloring or displaying by a simple construction.

According to a preferred embodiment of the present invention, a film molded casing includes a transparent or translucent film molded member having a printed layer provided on the inner surface thereof so as to define the location of an illumination display, and a casing inside of which a lens for guiding light of an internal light source to the appearance surface thereof is integrally formed with the casing using a light-permeable resin, in which a light transmitting area is integral with the casing so as to be contiguous with the lens, and on the inner surface of which a light-impermeable printed layer is provided. In this film molded casing, the light transmitting area is matched to the location of an illumination display of the film molded member.

In the film molded casing according to a preferred embodiment of the present invention, preferably, the thickness of resin around the lens in the casing is small in order to prevent the diffusion of light in the casing.

In the film molded casing according to a preferred embodiment of the present invention, it is preferable that at least two light transmitting areas of the film molded member and at least two of the lenses in the state where each of the light transmitting areas of the film molded member is matched to a respective one of the lenses, be provided, and that a light-shielding wall be provided between the lenses.

In the film molded casing according to a preferred embodiment of the present invention, preferably, a member arranged to achieve a light diffusing effect is applied to the light transmitting area of the casing.

In the film molded casing according to a preferred embodiment of the present invention, preferably, the printed layer in the light transmitting area is used as a light-diffusing printed layer.

In preferred embodiments of the present invention, since the lenses have been integrally formed with the casing, it is possible to easily form a light-guiding path that is free of seams without the need to increase the number of manufacturing processes.

Also, since coloring or display can be performed by printing, it is possible to apply, to a film base, printing that can achieve every design effect desired.

Furthermore, since printing is performed so as not to allow light to leak to the inner surface of the casing or that of the film, the occurrence of leakage of incident light at places other than the display places is eliminated.

Moreover, when a plurality of light sources are arranged side by side, the interference with each other can be prevented by providing a light-shielding wall therebetween.

Other elements, features, characteristics and advantages of the present invention will become more apparent from the following detailed description of preferred embodiments with reference to the attached drawings.

BRIEF DESCRIPTION OF THE DRAWINGS

FIGS. 3A to 3C are constructional views illustrating a conventional example.

DETAILED DESCRIPTION OF PREFERRED EMBODIMENTS

Hereinafter, preferred embodiments of the present invention will be described with reference to the accompanying drawings.

First Preferred Embodiment

Figures 1, 1A, 1B, 1C, 1D, 1E, 2, 3:
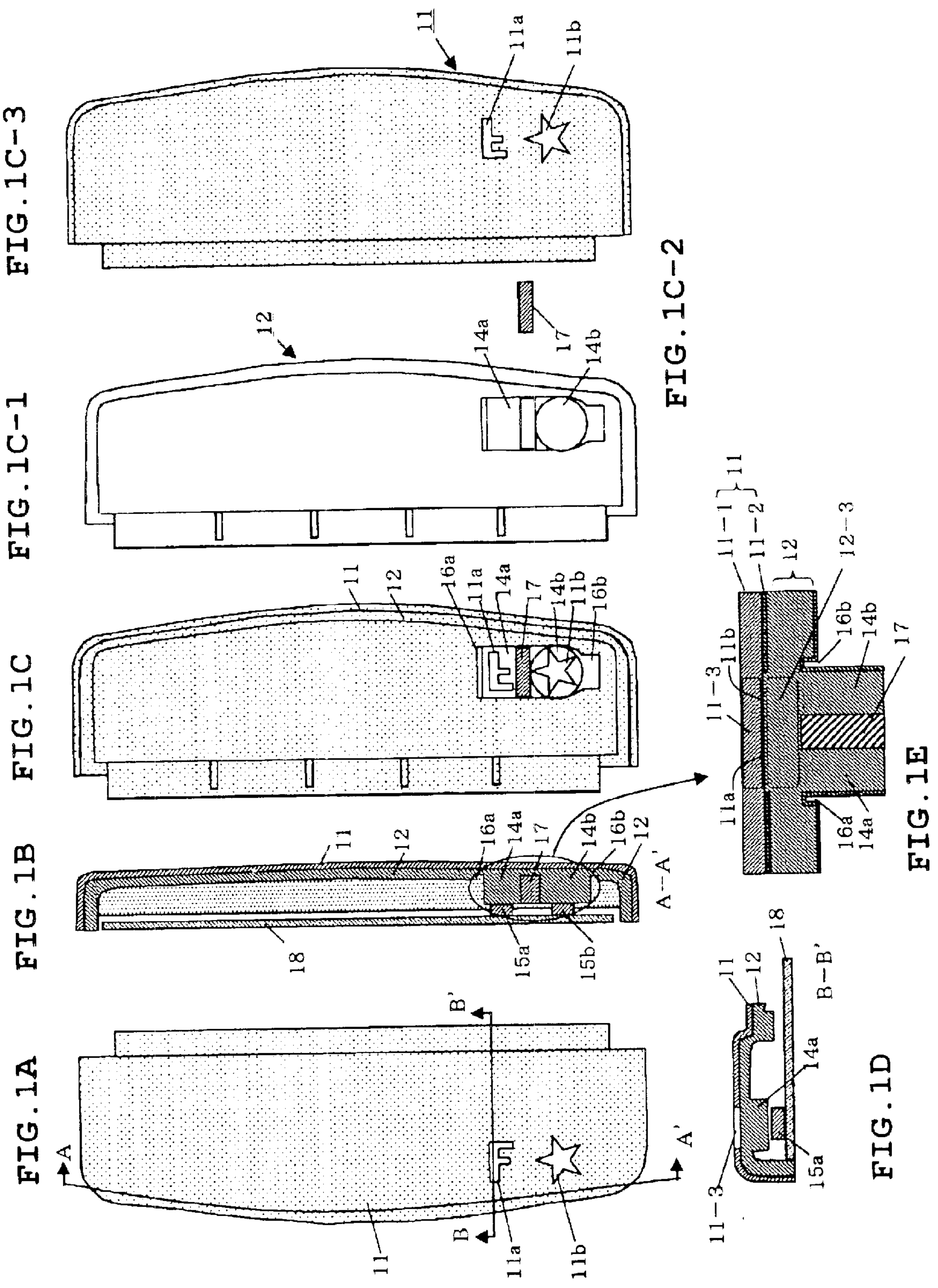
FIGS. 1A to 1E are constructional views illustrating a first preferred embodiment of the present invention.

FIGS. 1A to 1E are constructional views of a first preferred embodiment of the present invention, wherein an example of the extending portion of a CF card is illustrated. Here, FIG. 1A is a plan view of the extending portion, FIG. 1B is a sectional view taken along the line A–A' in FIG. 1A, and FIG. 1C is a rear view of the extending portion. FIG. 1D is a sectional view taken along the line B–B' in FIG. 1A, and FIG. 1E is an enlarged view of the critical portion marked with a oval in FIG. 1B. Also, FIG. 1C is decomposed into FIGS. 1C-1, FIGS. 1C-2, and FIGS. 1C-3 showing a casing 12, a light-shielding wall 17, and a film molded member 11, respectively.

The extending portion is configured so that unnecessary portions are blocked and that operational conditions thereof are illumination displayed. In FIG. 1, two light-transmitting portions subjected to illumination display are shown, but the extending portion only requires at least one light-transmitting portion.

As can be seen from FIGS. 1A to 1C, the casing 12 is, in its entirety, preferably formed into a lid-shape, one side of which is opened. Specifically, as shown in FIG. 12, which is an enlarged view of one portion in FIG. 1B, the casing 12 has lenses 14*a* and 14*b* which are integrally formed. The casing 12 is formed as a component of a lid member, and is insert molded by a transparent or translucent resin having rigidity in its entirety. LED lenses 14*a* and 14*b* are integrally formed with each other, and grooves 16*a* and 16*b* are provided so as to define light-transmitting areas corresponding to the above-described respective lenses. The grooves 16*a* and 16*b* constitute thin-walled portions in the casing 12. These grooves 16*a* and 16*b* inhibit incident light from wrapping-around to areas other than the light-transmitting areas.

The casing 12 has a frame structure therearound for reinforcement, and is preferably made of a rigid resin.

As seen from FIG. 1C-1 and FIG. 1C-3, the lenses 14*a* and 14*b* used as light-guiding members are respectively arranged so as to oppose the light-transmitting areas 11*a* and 11*b* of the film molded member 11. The lenses 14*a* and 14*b* are integrally formed with the Light-transmitting area 12-3 off the casing 12, and are defined by the grooves 16*a* and 16*b*, respectively. These lenses 14*a* and 14*b*, respectively, have areas including the character "F" in the light-transmitting area 11*a* and the star sign in the light-transmitting area 11*b*, and they extend from the inside surface of the casing 12 to positions in close proximity to light-emitting devices 15*a* and 15*b* on the substrate 18, respectively as shown in FIG. 1D.

Light-diffusing elements or material is applied to the casing 12. Also, a printed layer formed in the light-transmitting area on the inner surface of the film, that is, the printed layer 11-2 formed in the range shown in FIG. 1E so as to substantially cover or surround the light-transmitting area 12-3 in FIG. 1E, is preferably used as a light-diffusing printed layer, for example.

As material-based light-diffusing member, a material made by mixing a light-diffusing agent (a resin of light diffusion grade) into a transparent resin is preferably used. On the other hand, as print-based light-diffusing member, microscopic asperities on the printed surface are preferably used to diffuse light.

As a light-diffusing member, a material made by mixing a light-diffusing agent (a resin of light diffusion grade) into a transparent resin may also be preferably used.

The casing 12 is preferably formed by applying film in-mold molding (injection molding) to the film molded member 11. The purpose of using a transparent resin is to guide light of the LED light sources or the like that is made incident on the casing, to the light-transmitting areas in the display area and coloring area requiring the light of the LED light sources.

As shown in FIGS. 1C-1, the casing 12 is very simply constructed by integral molding in a manner such that its rear or inner surface, which is more complicated than its front or outer surface, is easily completed by inserting other components.

As shown in FIG. 1E, the film molded member 11 includes a transparent or translucent film base 11-1 and a printed layer 11-2 to be printed inside it.

The film molded member 11 includes a transparent or translucent resin film, and in a light-transmitting area 11-3 including the light-transmitting areas 11*a* and 11*b*, embossing work (asperities) is applied to the incident surface of LED light to diffuse light, or the above-described light diffusing member is applied.

Designs are printed by display or coloring onto the printed surface inside the film base 11-1, including the transparent light-transmitting areas of the character "F" and the star sign. In printing, the transparent light-transmitting areas 11*a* and 11*b* are either subjected to diffusion transmission printing, or are kept in a non-printed state (i.e., in a light-permeable state), and the other portions are subjected to light-shielding or blocking printing. In the printing, a metallic or pearl color, or patterns of such a color are usable on the surface portions other than the light-transmitting areas.

The film base 11-1 is subjected to display or coloring on its one surface, or provided with a light-diffusing layer as a printed layer, and thereafter it is subjected to mold drawing by air-pressure molding or other suitable process using a mold. Film in-mold molding is applied to the film molded member 11 that has been subjected to the mold drawing. Here, the "film in-mold molding" refers to a method in which the film molded member 11 that has been subjected to mold drawing is accommodated in a mold and in which a resin is injected to obtain the casing 12 integrally formed with the film molded member 11. For a resin used in film in-mold molding, a resin material having high light-permeability is preferably used.

As shown in FIGS. 1C-3, the film molded member 11 has a simple construction such that designs are printed in areas other than the light-transmitting areas 11*a* and 11*b*, and such that assembly work is performed.

As a light source, a light-emitting device such as LED or EL (electroluminescence) device, or other suitable device is preferably used, and a monochrome light source or a multicolored light source is prepared.

Advantages of First Preferred Embodiment

The first preferred embodiment of the present invention has the following effects and achieves the following advantages.

Since the designs of the surface can be expressed by printing, it is possible to use a metallic or pearl color, or patterns of such a color that has been unable to be expressed by ordinary resin or painting. Also, the existence of transparent portions with a thickness of film on the printed surface provides deep feeling.

Since there exists a film on the surface, the outer appearance is not affected even if surface sinks, welds, or the like occurs when the casing is molded. Also, since the printing of characters or the like is applied to the inner surface of the film, a problem of peeling or the like due to a long period of use does not occur.

Because a material with high light-permeability is used for the resin when integral forming is performed, the entirety of the molded casing performs the function of an LED lens. Because light-shield or light-blocking printing is applied to portions other than the light-emitting and display portions, the light-emitting state can be visually identified only from required portions out of the product surface.

Furthermore, because a casing having LED lenses can be formed by a single mold although two or more molds have had to be produced in the conventional casing, the initial cost for mold is greatly reduced.

Moreover, since the LED lenses are molded together with the casing, the assembly processes can be reduced, resulting in a decreased defective fraction and a reduced manufacturing cost. In addition, since the configuration of the light-emitting portions can be determined by printing, light emission with a complicated shape becomes practicable, which have been unable to be realized by the conventional method in which separate components are built in.

By preparing a multicolored light source and combining colors from respective light sources by the light-guiding members, it is possible to cause the display color tone of the illumination display portions to be rich in variety.

Second Preferred Embodiment

FIGS. 2A to 2D are constructional views of a second preferred embodiment of the present invention, wherein an example of the extending portion of a CF card is illustrated.

Figures 1, 2, 2A, 2B, 2C, 2D, 3:
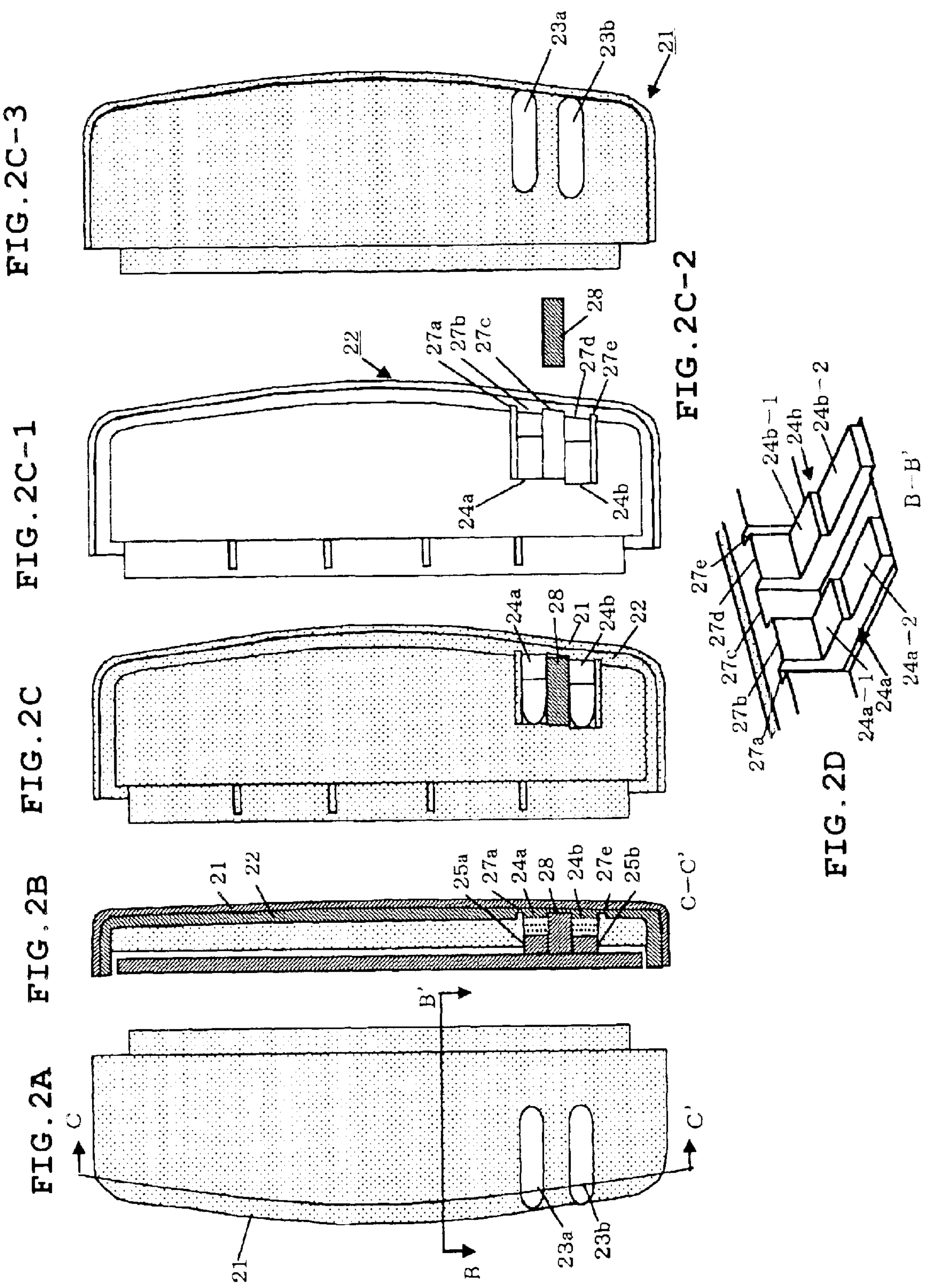
FIGS. 2A to 2D are constructional views illustrating a second preferred embodiment of the present invention.

FIG. 2A is a plan view of the extending portion, and FIG. 2B is a sectional view taken along the line C–C' in FIG. 2A, FIG. 2C is a rear view of the extending portion. FIG. 2C is decomposed into FIGS. 2C-1, FIGS. 2C-2, and FIGS. 2C-3 showing a casing 22, a light-shielding wall 28, and a film molded member 21, respectively. FIG. 2D is a perspective view of the lenses 24*a* and 24*b* taken along the line B–B' in FIG. 2A.

The second preferred embodiment illustrated in FIGS. 2A to 2D is different from the first preferred embodiment in that the respective lenses 24*a* and 24*b* in the casing 22 have light-guiding structures arranged so as to oppose two dual-color light sources, and such that the light-transmitting areas 23*a* and 23*b* of the film molded member 21 correspondingly have elongated structures so as to oppose the above-described lenses 24 and 24*b*, respectively.

The layer structure of each of the casing 22 and the film molded member 21 in the second preferred embodiment is preferably similar to that in the first preferred embodiment.

The other constructions in the second preferred embodiment are also the same as that in the first preferred embodiment.

As shown in FIG. 2C, the lenses 24*a* and 24*b* are each formed into a substantially rectangular shape in a plan view. As shown in FIG. 2D, the lens 24*a* is configured so that lenses 24*a*-1 and 24*a*-2 are disposed so as to oppose respective light sources and that they are integrally connected with each other with a step height provided therebetween. As in the case of the lens 24*a*, the lens 24*b* is also configured so that lenses 24*b*-1 and 24*b*-2 are integrally connected with each other with a step height provided therebetween.

As illustrated in FIG. 2D, on one side of the lens 24*a*, there is provided a groove 27*a* from the front end of the lens 24*a*-2 up to the inside of the casing 22. The groove 27*a* is preferably formed so that the angle in the depth direction thereof is substantially a right angle.

As in the case with the groove 27*a*, a groove 27*e* is provided on the other side of the lens 24*b*.

Between the lenses 24*a* and 24*b*, there is provided a groove 27*c* having substantially the same depth as that of 27*a*, from the front end of the lens 24*a*-2 up to the inside of the casing 22. The groove 27*c* is formed wider than the other grooves 27*a* and 27*e* in order to accommodate a light-shielding wall 28.

Thus, the casing 22 is constricted by the grooves 27*a*, 27*c*, and 27*e* so as to define protrusions 27*b* and 27*d* contiguous to the lenses 24*a* and 24*b*, respectively. These grooves 27*a*, 27*c*, and 27*e* can prevent light that has been made incident onto the lenses 24*a* and 24*b* from diffusing into the casing without being engaged in an illumination display action.

Moreover, the grooves 27*a*, 27*c*, and 27*e* can perform light shielding and supress wraparound of light, to prevent light that has been made incident onto the respective light-transmitting areas of the casing 22 opposed to the light-transmitting areas 23*a* and 23*b* of the film molded member 21 from unwantedly escaping.

In order to cause the light-transmitting areas of the casing 22 to produce a scattering effect, embossing work (asperities) may be applied to the light-incident surface of each of the LED lenses.

Advantages of Second Preferred Embodiment

The second preferred embodiment of the present invention has the same effects as those of the first preferred embodiment. In addition, by reducing the thickness of resin between a plurality of light-emitting portions, the diffusion of light within the resin having high light-permeability can be prevented, and by providing a light-shielding wall, interference of light between colors within the mold product can be inhibited.

Third Preferred Embodiment

A third preferred embodiment of the present invention uses a translucent film molded member instead of the transparent film molded members 11 and 21, used in the first and second preferred embodiments, respectively.

This translucent film molded member, which is essentially translucent, makes light sources poorly viewable, thereby eliminating the need to perform diffusion printing or to use a resin of diffusion grade.

Advantages of Third Preferred Embodiment

The third preferred embodiment of the present invention achieves the same effects and advantages as those of the first and second preferred embodiments. Besides, when a dual-color LED is used as a light source, the dual colors that are simultaneously made incident from a lens satisfactorily scatter on and in the translucent film molded member, thereby providing an improved mixed color.

While the present invention has been described through illustration of preferred embodiments with reference to the accompanying drawings, various modifications and changes can be made without departing from the spirit of the invention.

What is claimed is:

1. A case member for an electronic device comprising:

a film molded member having a printed layer disposed on an inner surface thereof so as to define a location of an illumination display; and a casing disposed adjacent to the inner surface of the film molded member such that an outer surface of the casing is in contact with the inner surface of the film molded member, said casing including at least one lens on an inner portion thereof for guiding light of an inner light source to an appearance surface of said casing, said lens being integral with the casing and made of a light-permeable resin, said casing further including at least one light transmitting area integrally formed with the casing so as to be contiguous with the at least one lens and a light-impermeable member provided on an inner surface of said casing; wherein the at least one light transmitting area is aligned with the location of the illumination display of the film molded member.

2. The case member according to claim 1, wherein the film molded member is one of a transparent film molded member and a translucent film molded member.

3. The case member according to claim 1, wherein the thickness of the light permeable resin around the at least one lens in the casing is small enough to prevent diffusion of light in the casing.

4. The case member according to claim 1, wherein the film molded member includes at least two light transmitting areas and said at least one lens of the casing includes at least two lenses, the at least two light transmitting areas of the film molded member and the at least two lenses of the casing are arranged such that each of the at least two light transmitting areas of the film molded member is matched to a respective one of the at least two lenses, and wherein a light-shielding wall is provided in the casing between the at least two lenses.

5. The case member according to claim 1, wherein the at least one light transmitting area of the casing includes a light-diffusing area.

6. The case member according to claim 1, wherein the light impermeable member is a light impermeable printed layer.

7. The case member according to claim 6, wherein the light impermeable printed layer in the at least one light transmitting area is a light-diffusing printed layer.

8. The case member according to claim 1, wherein the film molded casing is a component of a lid member.

9. The case member according to claim 1, wherein grooves are provided in the casing so as to define the at least one light-transmitting area that is contiguous with the at least one lens.

10.The case member according to claim 9, wherein the grooves are arranged to inhibit incident light from wrapping-around to areas other than the at least one light-transmitting area of the casing.

11. The case member according to claim 1, wherein the light impermeable member includes a light-diffusing agent and a transparent resin.

12. The case member according to claim 1, wherein the light impermeable member includes microscopic asperities on the inner surface.

13. The case member according to claim 1, wherein designs are provided in areas other than the at least one light transmitting area.

14. The case member according to claim 1, wherein the at least one lens includes a plurality of lenses provided in the casing and including light-guiding structures arranged so as to oppose at least two dual-color light sources.

15. The case member according to claim 14, wherein the film molded member includes light-transmitting areas having elongated structures so as to oppose the plurality of lenses.

* * * * *